United States Patent [19]

Ours

[11] 4,137,114
[45] Jan. 30, 1979

[54] METHOD OF MAKING A UNITARY LIGHTWEIGHT OUTER GARMENT

[76] Inventor: Pierre L. Ours, 4920 NE. Glisan, Portland, Oreg. 97213

[21] Appl. No.: 774,232

[22] Filed: Mar. 4, 1977

[51] Int. Cl.² ................. A41D 3/04; B32B 31/18
[52] U.S. Cl. ......................... 156/251; 2/87; 93/DIG. 1; 156/306
[58] Field of Search ............ 156/251, 515, 267, 273, 156/290, 306; 2/87, 167, 169, DIG. 3, DIG. 5; 93/DIG. 1, 33 H

[56] References Cited

U.S. PATENT DOCUMENTS

| | | | |
|---|---|---|---|
| 2,526,634 | 10/1950 | Chavannes | 2/167 X |
| 2,903,704 | 9/1959 | Plant, Jr. | 2/169 |
| 2,993,528 | 7/1961 | Plant, Jr. | 156/251 |
| 3,717,538 | 2/1973 | Hartung | 156/251 X |
| 3,817,802 | 6/1974 | Meyer | 156/290 X |
| 3,866,245 | 2/1975 | Sutherland | 156/251 X |

FOREIGN PATENT DOCUMENTS 49-8713   1974   Japan ..................... 156/251

Primary Examiner—Michael G. Wityshyn
Attorney, Agent, or Firm—Chernoff & Vilhauer

[57] ABSTRACT

A unitary, lightweight outer garment constructed of a thin polyethylene film includes front and rear panels which are joined together forming a medial body member, paired arms which extend outwardly and downwardly from the upper portion of the body member, and a head opening which is located in the upper margin of the body member. The arms and body member are arranged to have unjoined coplanar lower margins and the inner side margin of each arm and the adjacent side margin of the body member lie congruously along a common line. The garment is formed by placing two rectangular sheets of the film, having a width equal to the finished length of the garment, in overlying engagement with one another on a cutting surface, thermally die cutting the sheets into the appropriate shape, and thermally sealing the resulting cut margins to complete the garment.

1 Claim, 7 Drawing Figures

METHOD OF MAKING A UNITARY LIGHTWEIGHT OUTER GARMENT

BACKGROUND OF THE INVENTION

This invention relates to a garment. In particular it relates to a unitary, lightweight outer garment which is die formed from paired sheets of thermoplastic film.

In many outdoor activities it is desirable to have available a water repellent outer garment in the event of a change of weather. This particularly is true in activities such as skiing, hunting, fishing and hiking where rain protection is not readily at hand. In order that such a garment be unobtrusive when carried on the user, preferably it is lightweight and compactable into a small sized bundle.

Many such outer garments are known in the prior art. However, the prior art garments of this class are made by first cutting and forming the arms and the body separately and then joining the arms to the body. This process is time consuming and requires considerable hand work in fitting the elements together. Thus the initial cost of the prior art garments is relatively high. Also, due to this high initial cost they must be made to last for an extended period of time in order to acquire customer acceptance. Accordingly, they are made of a heavier material than is structurally required, resulting in a bulky garment which is difficult to compact into a carryable bundle.

SUMMARY OF THE INVENTION

In its basic concept, the garment of this invention comprises unitary body member and arms formed by thermally cutting two overlying sheets of thermoplastic film and sealing the resulting cut seams.

It is by virtue of the foregoing basic concept that the principal objective of this invention is achieved; namely, to overcome the aforementioned disadvantages and limitations of similar garments of the prior art.

Another object of this invention is to provide such a garment wherein one size fits most individuals.

Another object of this invention is to provide such a garment which can be folded into a compact bundle.

A further object is to provide such a garment which is formed by a method wherein no material is removed along its interior margins.

The foregoing in other objects, features and advantages of the present invention will be more readily understood upon consideration of the following detailed description, taken in conjunction with the accompanying drawings.

DESCRIPTION OF A PREFERRED EMBODIMENT

Figure 1:
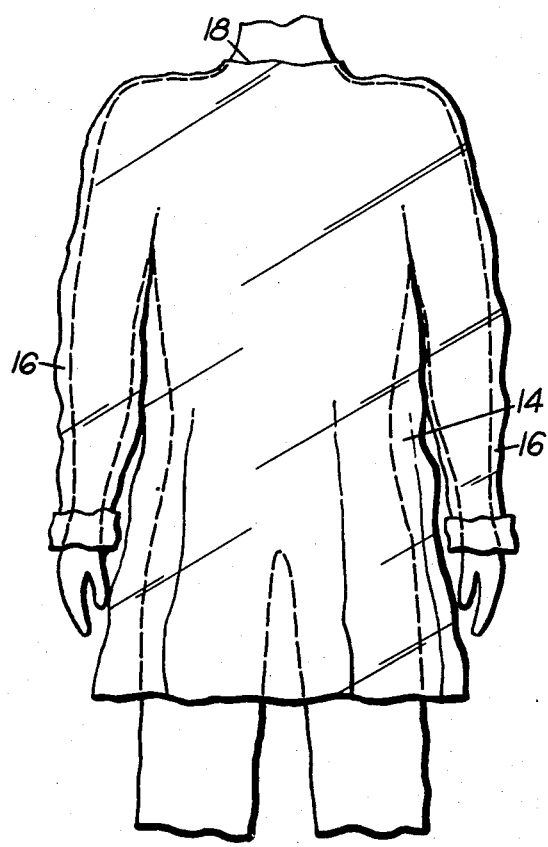
FIG. 1 is a plan view of the garment of the present invention expanded and in use.
Figure 2:
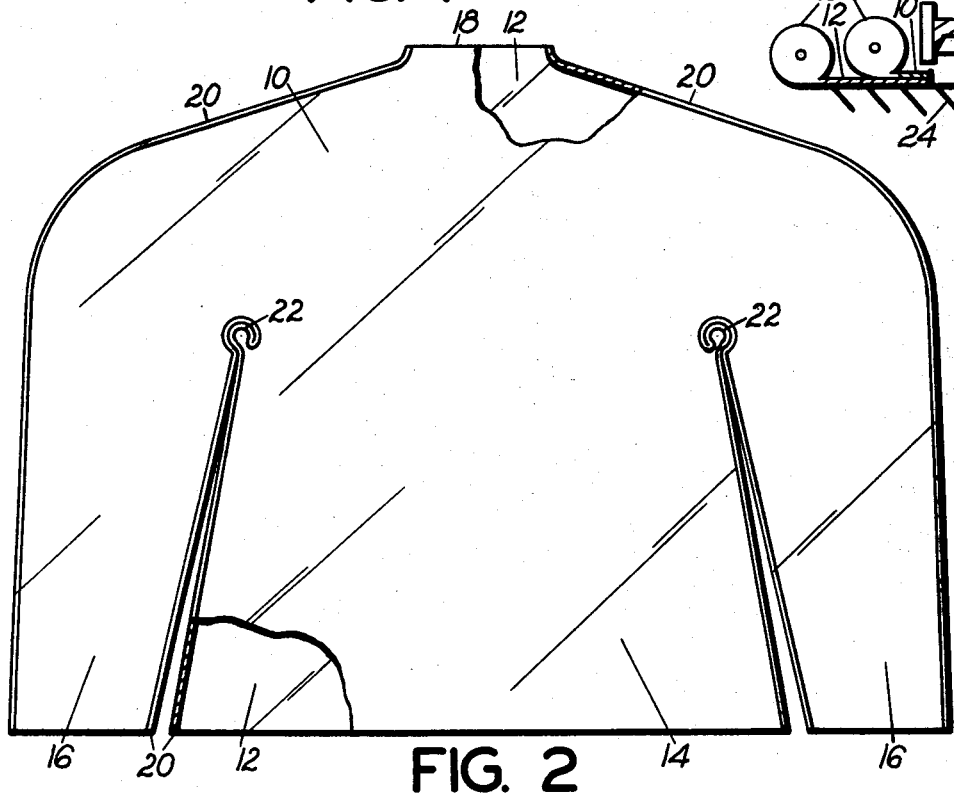
FIG. 2 is a plan view of the garment of FIG. 1 laying flat, at an enlarged scale and partially broken away to show hidden detail.
Figure 3:
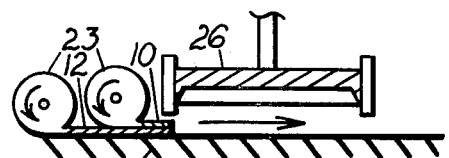
FIGS. 3-7 are diagramatic elevations showing the method by which the garment is made.
Figure 4:
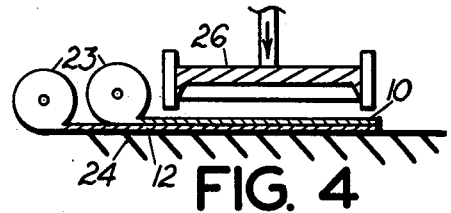
Figure 5:
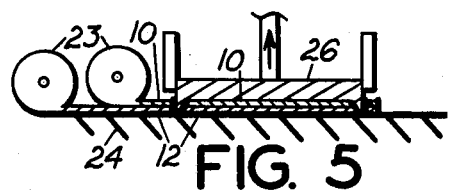
Figure 6:
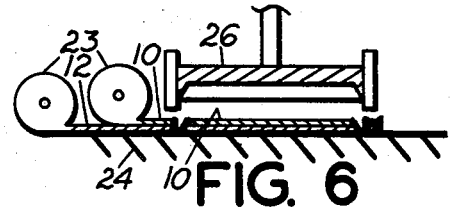
Figure 7:
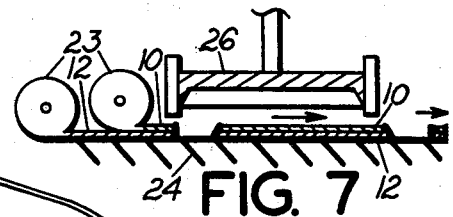

Referring to FIGS. 1 and 2 of the drawings, the garment of the present invention preferably is formed of thin, lightweight thermoplastic film, such as polyethylene. However, other plastic or non-plastic materials could be utilized in much the same manner. The garment is intended primarily as an overgarment for use in inclement weather conditions, and due to its light weight it can be folded into a relatively compact bundle for ease of carrying prior to or between wearing.

The garment comprises a front panel and a rear panel which are formed from separate sheets of the material. It comprises a body member 14 which expands to a generally tubular shape in use. Preferably the body member has a diameter of approximately 20 inches when expanded, allowing its use by a wide range of individuals.

Extending outwardly and downwardly from the upper portion of the body member are paired arms 16. The lower margins of the arms are coplanar with the lower margin of the body member and the inner side margin of each arm and the adjacent side margin of the body member lie congruously along a common line when the garment is laying flat, as a result of the method by which it is made as will be more fully explained later. Preferably the diameter of the arms when expanded is approximately 5 inches, again facilitating use by a wide range of individuals.

Located medially in the upper margin of the garment is a head opening 18. In the embodiment illustrated the head opening has a diameter of approximately 8–12 inches. A short upwardly facing neck is formed around the head opening to prevent tearing, and a circular tear gusset 22 is located at the lower intersection of each arm and the body member for strengthening this inherently weak joint, and providing greater freedom of arm movement, particularly to a raised position.

Joining the front and rear panels around all the cut seams of the garment is a bead 20. In the embodiment illustrated the bead is formed by heat sealing the plastic material.

Referring now to FIGS. 3-7, the method by which the garment is made includes placing two co-extensive rectangular sheets 10 and 12 of thin thermoplastic film in overlying engagement with one another. In the embodiment illustrated, the sheets are fed from rolls 23 which are approximately 38 inches wide for making a garment which fits most individuals. It has been found that 2 mil polyethylene film of 4% EVA gives a garment having the requisite combination of softness and strength, particularly in cold weather.

The overlying sheets are placed on a planar cutting surface such as platen 24. A die 26 having a cutting edge arranged in the outline of the garment then is used to cut the sheets. The die has a single cutting edge for cutting the sheets between each arm and the body member along a common line. In the embodiment illustrated, the die thermally cuts the sheets. Thus the cut margins are sealed together simultaneously with cutting. However, cutting and sealing could be done in separate steps, and when a non-plastic material is utilized it must be cut by shearing and then separately joined.

As best shown in FIG. 2, it will be noted that sheets 10 and 12 are dimensioned and oriented relative to die 26 such that the bottom margins of the sheets become the bottom margins of the body member and the arms, and the top margins of the sheets become head opening 18. If desired several of the dies can be ganged side by side and used to cut a plurality of the garments simultaneously.

The garment then is completed and can be removed from platen 24. If desired the garment can be decoratively printed by conventional means for either aesthetic or commercial purposes.

After forming the garment, it can be machine folded as desired for shipment. A garment of the size illustrated readily folds into a 6 inch long by 2½ inch wide by ½ inch thick bundle. In this configuration, the garment easily is carried by the user until such time as it is required. After use, it can again be folded to the same compact size, or due to its low initial cost it may be discarded if desired.

Having thus disclosed my invention in a preferred embodiment, I claim:

1. The method of making a garment comprising:
   (a) Placing two sheets of thin thermoplastic film in overlying engagement with one another;
   (b) Positioning the overlying sheets on a planar cutting surface;
   (c) Die cutting the overlying sheets in a manner to form a garment having a body member and paired arms, wherein the bottom margin of the body member and the bottom margins of the arms are formed from the bottom margin of the overlying sheets and the medial portion of the top margin of the garment is formed from the top margins of the overlying sheets;
   (d) Sealing together the margins of the cut sheets except for the bottom margins of the body member and the arms and the medial portion of the top margin of the body member;
   (e) Forming the inner side margin of each arm and the adjacent side margin of the body member by a single cut, said cut terminating in a circular tear gusset at the intersections of the arms and the body member; and
   (f) Performing the steps of die cutting and sealing simultaneously and with the same tool.

* * * * *